April 19, 1960 A. E. RUVIN 2,933,695
LINEAR-LOGARITHMIC AMPLIFICATION
Filed June 8, 1956
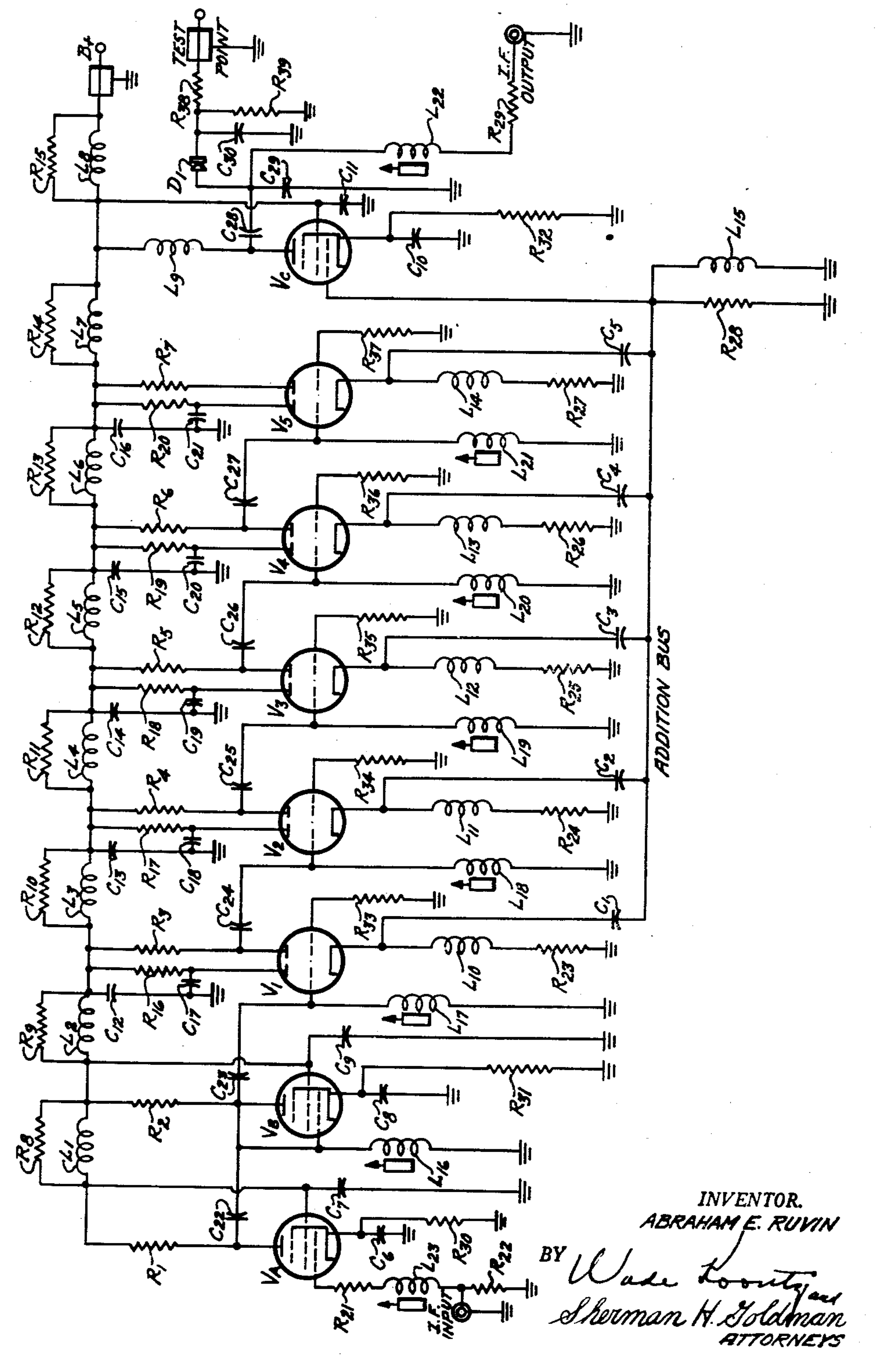
INVENTOR.
ABRAHAM E. RUVIN
BY Wade Koontz and
Sherman H. Goldman
ATTORNEYS United States Patent Office 2,933,695

Patented Apr. 19, 1960

2,933,695

LINEAR-LOGARITHMIC AMPLIFICATION

Abraham E. Ruvin, North Massapequa, N.Y., assignor to the United States of America as represented by the Secretary of the Air Force Application June 8, 1956, Serial No. 590,335

2 Claims. (Cl. 330—193)

This invention relates generally to amplifiers and more particularly to linear logarithmic amplifiers which are often called lin-log amplifiers.

Lin-log amplifiers are utilized to overcome the tendency of amplifiers to saturate when a very strong signal is applied. In moving target indication and radar circuitry, for example, the I.F. output preferably should provide a voltage that is a linear function of the input voltage for signals of low amplitude and approximately a logarithmic function for signals of high amplitude in order to avoid obliteration of weak signals. Accordingly, differentiation is possible between wide ranges of signals due to the fact that the output of the lin-log amplifier varies for each signal in the range rather than operating in a saturated condition which would produce the same output for input signals of various amplitudes.

Prior devices have utilized a multichannel method involving the use of several channels with different gains feeding to a common output through buffer means. The response of each channel was linear to a certain output and limited thereafter.

An object of this invention is the production of a device which reduces the complexity of prior art devices.

Another object of the invention is the provision of a device which attains a high degree of accuracy and is extremely stable.

A further object of the invention is the provision of a lin-log amplifier with an addition bus which eliminates the need for buffer stages between the amplifier and its addition bus.

A still further object of the invention is the presentation of a novel means for coupling stages of a lin-log amplifier to an addition bus.

Another object of the invention is the provision of a device which is both inexpensive and easily assembled from conventional, commercially available components.

A still further object of the invention is the provision of a device suitable for providing an output to a coherent detector.

These and other advantages, features and objects of the invention will become more apparent from the following description taken in connection with the illustrative embodiment of the invention in the accompanying drawing.

In the figure, a signal is presented at the I.F. input jack to tubes $V_A$ and $V_B$ and associated circuitry which comprises two conventional stages of amplification of the input with an over-all gain which preferably permits the lin-log crossover to be 30 to 40 db above noise level.

That portion of the circuitry which lends the lin-log characteristic to the unit comprises tubes $V_1$ through $V_5$ and associated circuitry. The tubes are illustrated in the figure as dual-triodes, each comprising one stage of the device. The left portion of the tube of each stage comprises a cathode follower whose input is capacitor coupled from the previous stage to its grid. The cathodes of each stage are tuned by means of inductors $L_{10}$ through $L_{14}$ and capacitors $C_1$ through $C_5$ to eliminate the occurrence of a phase shift. Capacitors $C_1$ through $C_5$ in the order of micro-microfarads, also attenuate the output signal from each cathode and couple it to an addition bus which provides a common collecting place for the in-phase voltages to be added.

Tube $V_1$, of course, receives its signal from $V_B$ while the remaining stages, $V_2$ through $V_5$, receive their signals from the preceding stage, which, in the schematic illustration, is the right side of the dual-triode arranged as a grounded grid amplifier.

The outputs of each stage are collected on the addition bus and the combined output is directly coupled to tube $V_C$ which functions as a linear amplifier to provide the I.F. output which may be presented to a detector.

The feedback of the circuit is of a negative polarity; therefore, the amplifier is stable under all conditions.

The grounded grid amplifier portion of $V_5$ need not have any connections to its plate or grid nor would it have to be a dual-triode; however, the device has been arranged in preassembled units for mass production as the circuitry for tubes $V_1$ through $V_5$ is identical for each tube and the connections of the grounded grid amplifier of $V_5$ aid in the retention of identical electrical characteristics of that stage with the previous stages. Much of the circuitry of $V_A$, $V_B$ and $V_C$ is identical, therefore, partially assembled units may be prepared prior to final assembly in order to facilitate economic production of the device.

The lin-log characteristic is achieved by adding the levels of all the stages, which are arranged to saturate at different input levels to the amplifier. When a signal is presented at the input, it is amplified successively in $V_A$ and $V_B$ and presented to lin-log section, $V_1$–$V_5$. Signals of low amplitude, when presented to the lin-log section, have the outputs from each cathode follower stage attenuated and added on the addition but which presents the combined signal to the tube $V_C$ which linearly amplifies said signal and supplies it to the output jack. No stage reaches saturation in this case. A signal of larger amplitude when applied to $V_1$ and amplified and presented to tube $V_2$, etc., will tend to saturate one or more of the later stages of $V_1$ through $V_5$ starting from the last stage. Of course, the larger the amplitude of the input signal, the more stages will reach saturation. The resultant curve obtained by plotting input against output starts as a linear curve and then becomes logarithmic as the amplitude of the input signal increases.

In order to demonstrate the adaptability of the device for mass production techniques and to illustrate a workable embodiment, the following values of the components schematically shown in the figure have been found to give the desired result:

*Tubes*

| | |
|---|---|
| $V_A$–$V_C$ | 6AK5 |
| $V_1$–$V_5$ | 6J6 |

*Resistors in ohms, ½ watt, ±10%*

| | |
|---|---|
| $R_1$–$R_7$ | 1.5K |
| $R_8$–$R_{15}$ | 470 |
| $R_{16}$–$R_{29}$ | 100 |
| $R_{30}$–$R_{32}$ | 180 |
| $R_{33}$–$R_{37}$ | 10 |
| $R_{38}$ | 120K |
| $R_{39}$ | 22K |

*Capacitors in μμf.*

| | |
|---|---|
| $C_1$–$C_5$ | 2 |
| $C_6$–$C_{21}$ | 1000 |
| $C_{22}$–$C_{28}$ | 62 |
| $C_{29}$ | 5 |
| $C_{30}$ | 100 |

*Inductors*

| | |
|---|---|
| $L_1$–$L_9$ | 14 μh. |
| $L_{10}$–$L_{15}$ | 3 μh. |
| $L_{16}$–$L_{22}$ | 20T No. 28. |
| $L_{23}$ | 26T No. 30. |
| Diode | IN 34A |

Although the invention has been described with reference to a particular embodiment, it will be understood to those skilled in the art that the invention is capable of a variety of alternative embodiments within the scope of the appended claims.

I claim:

1. A linear-logarithmic amplifier comprising a plurality of electronic amplifying channels connected in cascade, each of said channels comprising a cathode follower and a grounded grid amplifier cathode coupled thereto, said cathode follower providing an output in phase with the cathode followers of all the channels, said grounded grid amplifier providing an output to the next following channel, means for receiving the output of each cathode follower, and capacitor means for attenuating and coupling the output of each cathode follower to said means such that the combined output on said means for receiving the outputs of each cathode follower is linear for input signals of low amplitude and become logarithmic for input signals above a predetermined amplitude.

2. A linear-logarithmic amplifier circuit adapted to linearly amplify input signals of an amplitude below a predetermined value and provide a logarithmic output for input signals above said predetermined value comprising a plurality of saturable cathode follower amplifiers, grounded grid amplifier means between said cathode follower amplifiers, said grounded grid amplifiers being cathode coupled to the cathode follower preceding it and providing an output to the cathode follower following it, capacitor coupling means connected to the output of each cathode follower, and means connected with said coupling means for additively combining all the outputs from all of said cathode followers, the combined signal being linear for input signals below said predetermined amplitude and logarithmic for input signals above said predetermined value.

References Cited in the file of this patent

UNITED STATES PATENTS

| | | |
|---|---|---|
| 2,430,201 | Selove | Aug. 30, 1949 |
| 2,485,665 | Shepherd | Oct. 25, 1949 |
| 2,496,551 | Lawson et al. | Feb. 7, 1950 |
| 2,575,073 | Selz et al. | Nov. 13, 1951 |
| 2,662,978 | Sunstein | Dec. 15, 1953 |
| 2,725,191 | Ham | Nov. 29, 1955 |
| 2,774,825 | Sherr | Dec. 18, 1956 |
| 2,870,409 | Bigelow | Jan. 20, 1959 |